US011366329B2

(12) United States Patent
Blomqvist et al.

(10) Patent No.: US 11,366,329 B2
(45) Date of Patent: Jun. 21, 2022

(54) METHOD AND DEVICE FOR SWITCHING INPUT MODALITIES OF A DISPLAYING DEVICE

(71) Applicant: Tobii AB, Danderyd (SE)

(72) Inventors: Niklas Blomqvist, Danderyd (SE); Robin Thunström, Danderyd (SE); Dennis Rådell, Danderyd (SE); Ralf Biedert, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/245,067

(22) Filed: Apr. 30, 2021

(65) Prior Publication Data

US 2022/0011584 A1      Jan. 13, 2022

Related U.S. Application Data

(63) Continuation of application No. 16/711,056, filed on Dec. 11, 2019, now Pat. No. 10,983,359.

(30) Foreign Application Priority Data

Dec. 11, 2018  (SE) .................................... 1851545-2

(51) Int. Cl.
*G02B 27/01* (2006.01)
*G06F 3/01* (2006.01)
(52) U.S. Cl.
CPC ..... *G02B 27/0179* (2013.01); *G02B 27/0172* (2013.01); *G06F 3/013* (2013.01); *G06F 3/014* (2013.01); *G02B 2027/0187* (2013.01)

(58) Field of Classification Search
CPC ............ G02B 27/0179; G02B 27/0172; G02B 2027/0187; G06F 3/013; G06F 3/014
See application file for complete search history.

(56) References Cited

U.S. PATENT DOCUMENTS

| 9,542,958 B2 * | 1/2017 | Sendai ............... G02B 27/0172 |
| 10,539,787 B2 * | 1/2020 | Haddick ............ G02B 27/0093 |
| 2017/0059871 A1 * | 3/2017 | Hashiba .................. A63F 13/25 |
| 2020/0081534 A1 * | 3/2020 | Erivantcev .............. A63F 13/24 |

* cited by examiner

*Primary Examiner* — Andrew Sasinowski
(74) *Attorney, Agent, or Firm* — Samuel I. Yamron (57) ABSTRACT

Disclosed is a method for switching user input modality of a displaying device displaying an interactable region. The displaying device is in communication with a first input modality and a second input modality. The first input modality is an eye tracker configured to determine gaze data of a user and the second input modality is an input modality other than an eye tracker configured to determine a pointing ray. The first input modality is selected as the input modality of the displaying device. The method comprises determining whether the pointing ray of the second input modality is intersecting with the interactable region. The method further comprises, based on the determining switching the input modality of the displaying device to the second input modality when the pointing ray of the second input modality is intersecting with the interactable region.

13 Claims, 5 Drawing Sheets

Fig. 5

METHOD AND DEVICE FOR SWITCHING INPUT MODALITIES OF A DISPLAYING DEVICE

CROSS-REFERENCES TO RELATED APPLICATIONS

This application claims priority to Swedish Application No. 1851545-2, filed Dec. 11, 2018; and U.S. patent application Ser. No. 16/711,056, filed Dec. 11, 2019, the content of which are hereby incorporated by reference.

TECHNICAL FIELD

The present disclosure relates generally to methods, systems and devices for switching between user input modalities in a displaying device displaying an interactable region.

BACKGROUND

Today, eye-tracking technology is used for various different applications, for example Virtual Reality, VR, or Augmented Reality, AR. In some applications where eye-tracking is used, including VR and AR applications, the user on whom the eye-tracking is performed is wearing a head mounted device, HMD. The HMD can in some cases have a display and can in these cases also be referred to as a head mounted display. Further, in some applications the user can use eye-tracking for a remote display, such as a TV.

Eye-tracking can be used for various features, for example in order to obtain gaze data of a user for deciding what a user intends to interact with, in a region which is possible for the user to interact with, called interactable region. Another, and more traditional way, of determining what a user intends to interact with is to use a pointing device.

In applications where both eye-tracking and pointing devices are possible to use, it can be beneficial for a user to be able to switch between the different types of input, i.e. different input modalities, when using the displaying device.

Consequently, there exists a need for improvement when it comes to switching between input modalities for a user of a displaying device having functionality for both an eye-tracking feature and for another pointing device.

SUMMARY

It is an object of the invention to address at least some of the problems and issues outlined above. An object of embodiments of the invention is to provide methods and devices for switching between user input modalities for a user of a device in a way that is efficient and provides a good user experience.

According to one aspect, a method is provided for switching user input modality of a displaying device displaying an interactable region. The displaying device is in communication with a first input modality and second input modality. The first input modality is an eye tracker configured to determine gaze data of a user, and the second input modality is an input modality other than an eye tracker configured to determine a pointing ray, wherein the first input modality is currently selected as the input modality of the displaying device. The method comprises determining whether the pointing ray of the second input modality is intersecting with the interactable region. The method further comprises, based on the determining, switching the input modality of the displaying device to the second input modality when the pointing ray of the second input modality is intersecting with the interactable region.

According to another aspect, a displaying device is provided for switching user input modality of a displaying device displaying an interactable region. The displaying device is in communication with a first input modality and second input modality. The first input modality is an eye tracker configured to determine gaze data of a user, and the second input modality is an input modality other than an eye tracker configured to determine a pointing ray, wherein the first input modality is currently selected as the input modality of the displaying device. The displaying device is operative for determining whether the pointing ray of the second input modality is intersecting with the interactable region. The displaying device is further operative for, based on the determining, switching the input modality of the displaying device to the second input modality when the pointing ray of the second input modality is intersecting with the interactable region.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The present disclosure relates to methods and devices for switching between different input modalities in a displaying device having an interactable region and which is in communication with at least a first and a second input modality. For the purpose of this application, input modality is intended to denote something that is used to determine what a user intends to interact with in an interactable region displayed by the displaying device to the user. An input modality can also be seen as a device for inputting user commands. Traditional ways of determining what a user intends to interact with include pointing devices, and in recent years eye-tracking technology has developed to such an extent that it may also be used to determine what a user intends to interact with in an interactable region. Since there are now different ways of interacting with what is displayed by a device, i.e. various different input modalities available for an interactable region of a displaying device, it also becomes relevant to figure out how to switch between such input modalities in a way that entails a pleasant user experience. The present disclosure provides a way to do this.

Briefly described, the methods and devices provided herein are for switching input modality of a displaying device, wherein the displaying device displays a region which is possible for a user to interact with, i.e. an interactable region. The displaying device comprises least two different input modalities wherein a first input modality is an eye-tracking feature and a second input modality is an input modality other than eye-tracking which is configured to determine a pointing ray, wherein the eye-tracking is currently selected as the input modality for the displaying device. The method comprises determining whether the pointing ray of the second input modality intersects with the interactable region displayed by the displaying device. Based on the determining, the input modality of the displaying device is switched from the first input modality to the second input modality, when the pointing ray of the second input modality intersects with an interactable region. The method may further comprise switching back to the first input modality after the pointing ray of the second pointing device stops intersecting with the interactable region of the displaying device. An example of a typical use-case is when a user of the displaying device is first using eye-tracking in order to indicate what the user intends to interact with, but then wants to switch to another input modality which is not eye-tracking due to some reason, for example in order to achieve a higher degree of accuracy or simply because the user prefers using other input modalities than eye-tracking.

Figure 1:
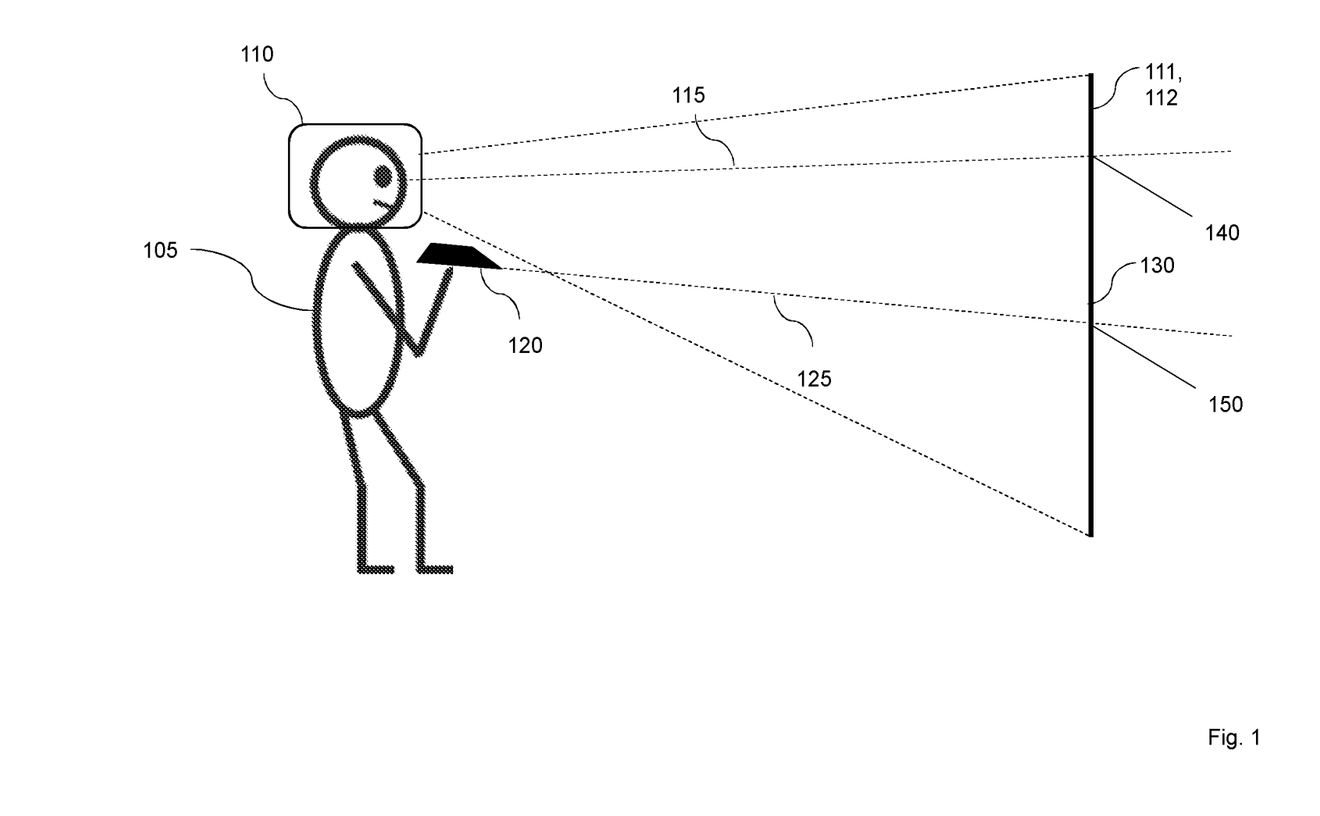
FIG. 1 shows, in a two-dimensional view, an example of an environment in which methods according to the present disclosure may be performed.

FIG. 1 shows a two-dimensional drawing of an environment in which the present disclosure is applicable, comprising a user 105, a displaying device 110, 112 comprising a first input modality in the form of an eye-tracker which may be determined to determine a gaze ray 115, and a second input modality 120 in the form of a hand-held pointing device, which is configured to determine a pointing ray 125. The pointing ray 125 may in some embodiments be visible to a user in the physical world, in some embodiments it may be invisible to the user in the physical world and visible in the virtual world, and in some embodiments it may be invisible to the user altogether. In some embodiments, the present disclosure is implemented in an environment comprising a displaying device 110 in the form of a Head-Mounted Device, HMD, 110 which is configured to display an interactable region 130 to a user 105 wearing the HMD 110, wherein the interactable region 130 may be virtual, which is often the case in Virtual Reality, VR, and Augmented reality, AR, applications, or physical. In some embodiments, the displaying device 110 may be adapted to display the interactable region at a predetermined distance from a user. In some embodiments, the displaying device 110 may be adapted to display the interactable region at a predetermined angle relative to a head position of the user 105 wearing the displaying device 110, and/or relative to a position of the displaying device 110. The displaying device 110 is further configured to determine gaze data of a user, wherein the gaze data is data related to where a user is looking, as determined by the eye-tracking functionality of the displaying device 110. The gaze data of a user may in some embodiments comprise a gaze ray 115, intended to represent or approximate the focus of the user's 105 eyes, i.e. where the user 105 is looking. In a typical embodiment, the first input modality, i.e. the eye-tracking feature, is the selected input modality for the displaying device when the users starts using it.

In some embodiments, the present disclosure may be implemented in an environment comprising a displaying device in form of a remote display 112, such as a TV, which is mounted at a distance from the user. In the case of a remote display 112, the eye-tracking functionality of the displaying device 112 may be incorporated into the displaying device 112, or it may require an additional device, for example one that is mounted on the head of a user and is operatively connected to the displaying device 112.

Regardless of if the displaying device 110, 112 is a HMD 110 configured to display an interactable region 130, or a remote displaying device 112 comprising a physical display representing the interactable region 130, the displaying device 110, 112 is adapted to determine whether the pointing ray 125 of the second input modality 120 is intersecting with the interactable region 130. An intersection between the pointing ray 125 of the second input modality 120 and the interactable region 130 is denoted by 150 in FIG. 1. As will be understood, it is possible for the pointing ray 125 to not intersect with the interactable region 130 in FIG. 1 at the junction denoted 150, as long as it is outside of the interactable region 130 in the depth dimension (not shown in FIG. 1). This will be further elaborated on in relation to FIG. 2.

In some embodiments, the displaying device 110 is further adapted to determine a gaze ray 115 of the user. The gaze ray 115 is similar to the pointing ray 125 in that it represents a focus of the user, i.e. what the user intends to interact with, but originates from an eye-tracking feature of the displaying device 110 rather than from an input-modality which is not eye-tracking. In some embodiments, an intersection 140 between the gaze ray 115 and the interactable region 130 may be determined and used for as a basis for other method steps.

In some embodiments, a third input modality may also be available, not shown in FIG. 1, wherein the third input modality, like the second input modality 120, is also an input modality other than an eye-tracker configured to determine a pointing ray.

Figure 2:
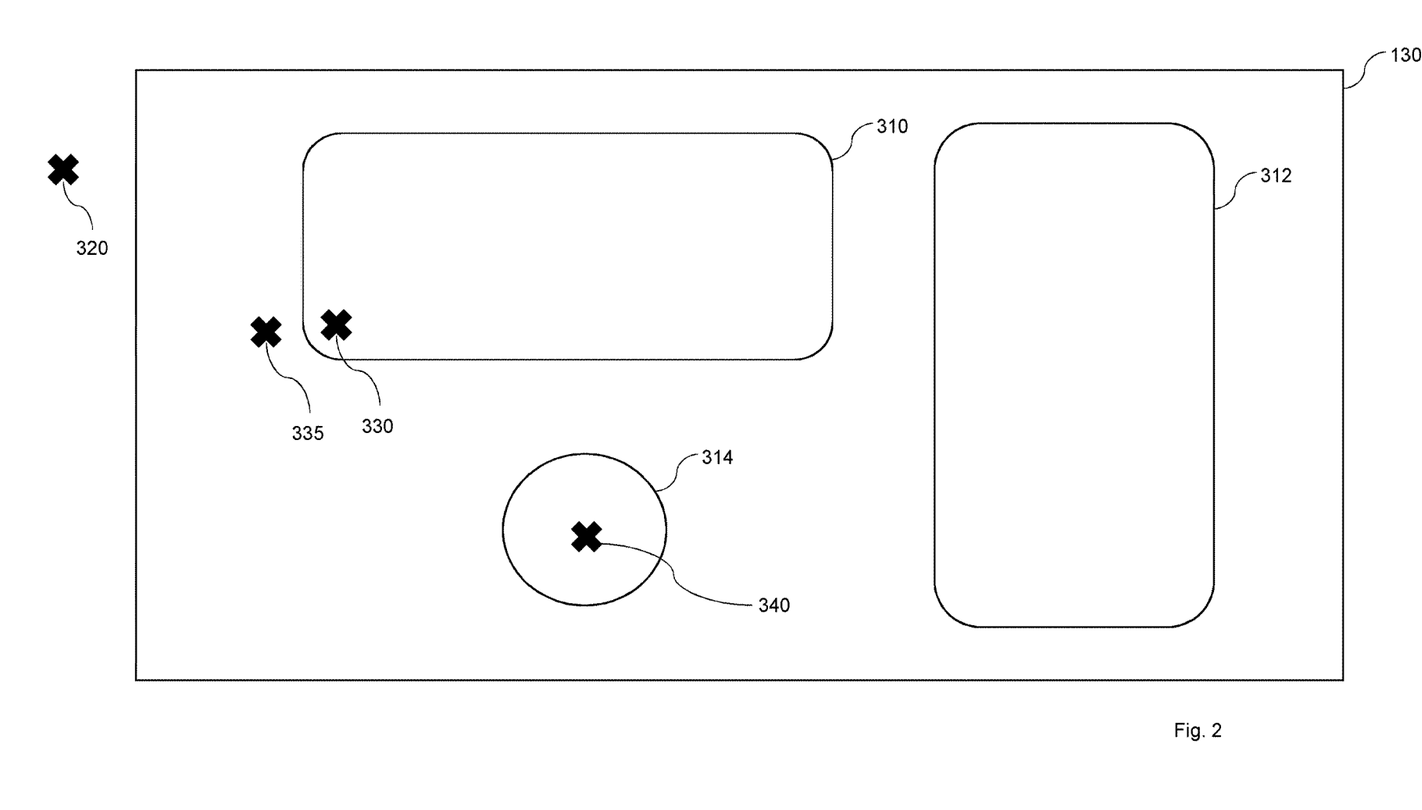
FIG. 2 shows, in a two-dimensional view, an example of an interactable region and surrounding regions.

Looking now at FIG. 2, a two-dimensional example of an interactable region 130 is shown, which may be seen as another view of the interactable region 130 of FIG. 1, shown from the perspective of the user 105 of FIG. 1. The interactable region 130 has defined boundaries as shown in FIG. 2, which may be virtual boundaries in the case the displaying device is a HMD projecting an interactable region 130, and which may be physical boundaries in the case the displaying device is a remote display. The interactable region 130 may comprise user-selectable regions 310, 312, 314, which denote something that the user of the displaying device can select, such as an e.g. an icon or a menu. The pointing ray 125 of the second input modality 120 can intersect with the interactable region 130 at different positions 330, 335, 340 within the interactable region 130, and such an intersection 330, 335, 340 between the pointing ray of the second input modality and the interactable region 130 may be seen as the point within the interactable region 130 a user intends to interact with, which may indicate that the user intends to select any of the user-selectable regions 310, 314. As will also be understood, it is possible that the pointing ray of the second input modality does not intersect with the interactable region 130, which may be seen as a case where the user of the second input modality does not intend to interact with the interactable region 130. In such a case, the pointing ray of the second input modality may intersect with a plane that is co-planar with the interactable region, at a point 320 outside of the interactable region. In such a case, it would typically not be beneficial for the user to switch from the first input modality to the second input modality, since it indicates that the user does not intend to interact with anything within the interactable region 130.

In some embodiments, the user of the displaying device may intend to select one of the user-selectable regions 310, 312, 314 of the interactable region 130. In such embodiments, the present disclosure may comprise only switching from the first input modality to the second input modality if the pointing ray 125 of the second input modality 120 also intersects with the user-selectable region 310, 312, 314. Depending on implementation, it can differ how it is determined that the pointing ray 125 of the second input modality 120 intersects with one of the user-selectable regions 310, 312, 314. In some embodiments, the pointing ray of the second input modality is considered to intersect with a respective user-selectable region when the intersection is inside of the user-selectable region, for example the intersection 330 would indicate that the pointing ray of the second input modality intersects with the user-selectable region 310, and the intersection 340 would indicate that the pointing ray of the second input modality intersects with the user-selectable region 314. In some embodiments, the pointing ray of the second input modality may be considered to intersect with a user-selectable region as long as it is within a predetermined distance of the user-selectable region, for example the intersection 335 may in some embodiments be considered to intersect with user-selectable region 310, and in some embodiments it may be considered to not intersect with the user-selectable region 310.

Figure 3:
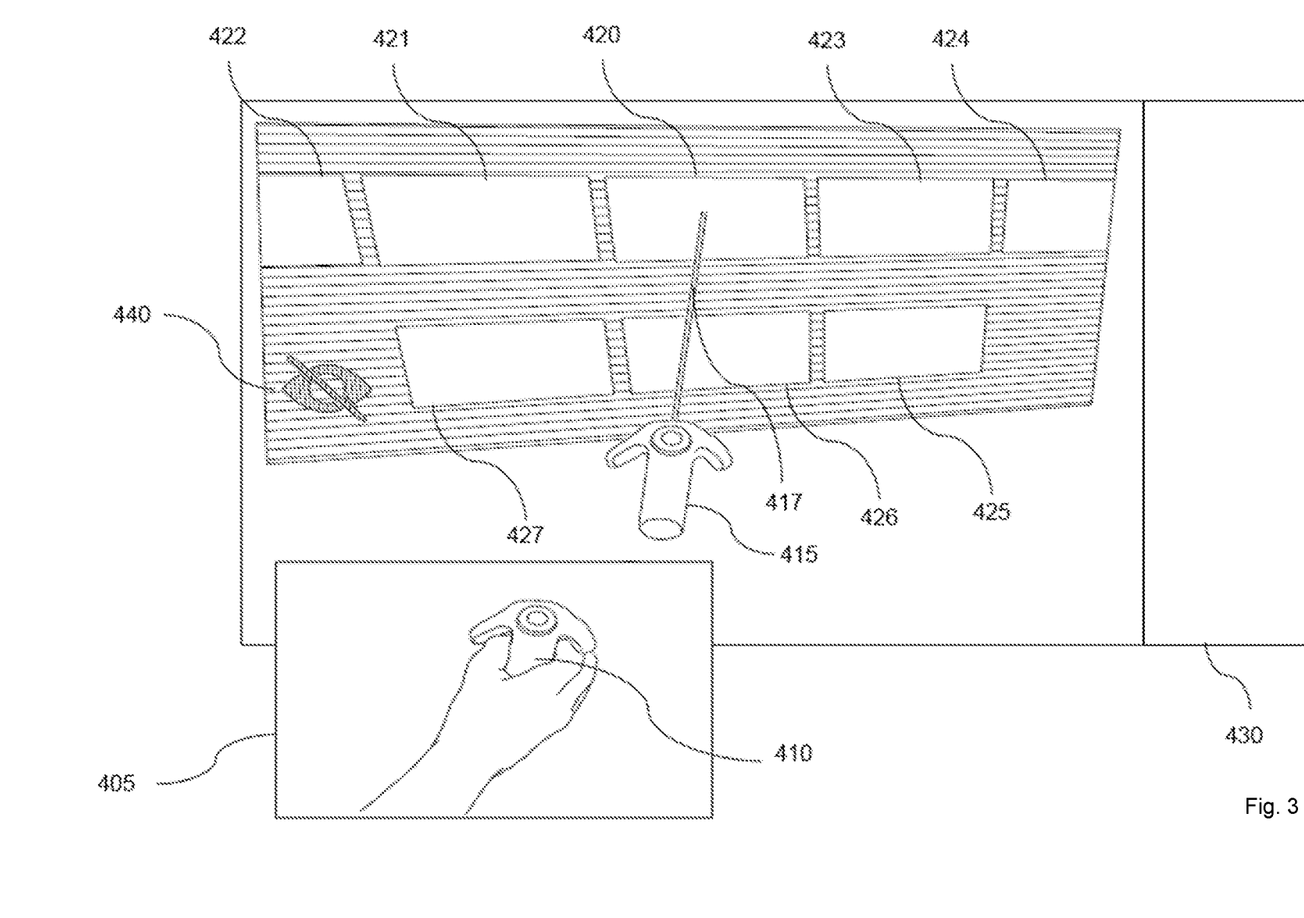
FIG. 3 shows, in a three-dimensional view, an example of an environment in which methods according to the present disclosure may be performed
Figure 4:
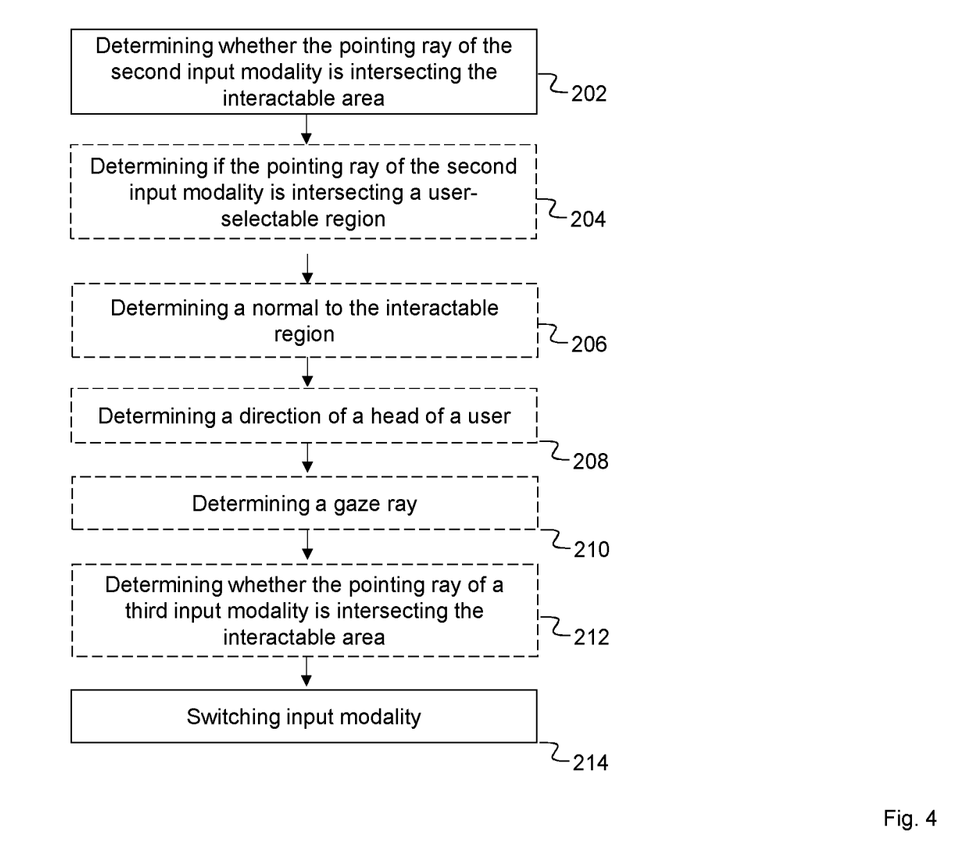
FIG. 4 shows a block schematic of method steps according to an embodiment.

FIG. 3 shows a three-dimensional representation of an environment of the present disclosure, in a case where a user is wearing a HMD projecting an interactable region to the user. The bottom left corner 405 shows the hand of the user in the real world, holding a second input modality 120 in the form of a hand-held pointing device 410. The user is wearing a displaying device in the form of a HMD, which is currently projecting what is shown in FIG. 4 to the user, except for the bottom left corner 405. The second input modality 120 is represented virtually to a user of the displaying device as a virtual pointing device 415, which is configured to determine a pointing ray 417. In the example shown in FIG. 3, the pointing ray 417 of the second input modality 410 is intersecting with a user-selectable region 420, represented by a virtual icon, which indicates that the user intends to select the user-selectable region 420 by use of the second input modality 410. The projected display may further comprise additional user-selectable regions 421, 422, 423, 424, 425, 426, 427. In some embodiments, the entire virtual representation displayed by the displaying device may be the interactable region, and in some embodiments the interactable region may be a subset of what is shown to a user by the displaying device. To exemplify a distinction between what is displayed to a user and the interactable region, the rightmost part 430 of FIG. 3 is used. The rightmost part 430 may in some embodiments be part of what is projected by the displaying device, or physically a part of the displaying device in case the displaying device is a remote displaying device, but still be considered as outside of the interactable region. Thus, if a user of a displaying device 110, 112 where the first input modality is currently selected, would point the pointing ray of the second input modality in the region 430, the method according to an embodiment would not switch to the second input modality since the region 430 is not considered a part of the interactable region, even though it is part of what is being displayed to the user.

In some embodiments, the virtual representation displayed by the displaying device may further comprise an indication 440 which indicates which input modality is being used. In some embodiments, this is done by the indication 440 showing whether eye-tracking is being user as the selected input modality of the displaying device or not. The symbol 440 shown in FIG. 3 represents that eye-tracking is currently not being used as the selected input modality of the displaying, which entails that the second input modality is being used as input modality, in the case where the displaying device is in communication with two input modalities.

Looking now at FIG. 4, in combination with FIGS. 1, 2 and 3, the steps of a method for switching between input modalities of a displaying device according to one embodiment will now be described in more detail. The method may in some embodiments be performed by the displaying device 110, 112, and in some embodiments the method may be performed elsewhere using data obtained from the displaying device 110, 112, for example in a cloud environment to which the displaying device 110, 112 is operatively connected. The displaying device 110, 112 displays an interactable region 130 and comprises at least two different ways for a user to decide what to interact with in the interactable region, i.e. at least two different input modalities, wherein one input modality is eye-tracking and another input modality is a device other than an eye tracker, configured to determine a pointing ray. The method is performed for a displaying device 110, 112 in which the first input modality, i.e. the eye-tracking functionality, is currently selected as input modality.

The method comprises determining 202 whether the pointing ray 125 of the second input modality is intersecting with the interactable region 130. The interactable region 130 is the region being displayed by the displaying device 110, 112 with which a user can interact. In some embodiments, the displaying device 110, 112 can be a head-mounted display, HMD, device, 110 which is common in e.g. VR and AR applications. In some embodiments the displaying device 110, 112 is adapted to display a two-dimensional interactable region 130. In some embodiments, the displaying device 110, 112 can be mounted at a distance from the user, a so-called remote display 112, such as a TV or similar. In some embodiments, especially embodiments used in VR or AR, the interactable region 130 may be the field-of-view of a user, or what is being displayed by the displaying device 110, 112. In some embodiments, especially embodiments wherein the displaying device 110, 112 is a remote display 112, the interactable region 130 may be the physical display 112 of the displaying device 110, 112.

The pointing ray 125 of the input modality which is not eye-tracking is typically a ray in a straight line which is being emitted by the input modality, which may or may not be visible to a user. In some embodiments, the input modality which is not an eye-tracker is a pointing device, such as a hand-held pointer or a hand-gesture based pointing device.

In order to perform the step of determining 202 whether the pointing ray 125 of the second input modality is intersecting with the interactable region 130, some properties of the interactable region 130 need to be known including at least where its boundaries are located, as well as at least the direction in which the pointing ray 125 of the second input modality is pointing. In some embodiments, both a location and a size of the interactable region is determined in step 202, as well as a direction of the pointing ray of the second input modality. In embodiments wherein the interactable region 130 is a two-dimensional plane, determining 202 whether the pointing ray 125 of the second input modality is intersecting with the interactable region 130 comprises determining if the pointing ray 125 of the second input modality is pointing in a direction such that it intersects with the two-dimensional plane of the interactable region 130. In embodiments wherein the interactable region 130 is a three-dimensional space, determining 202 whether the pointing ray 125 of the second input modality is intersecting with the interactable region 130 may comprise determining if the pointing ray 125 of the second input modality is intersecting with any part of the three-dimensional space representing the interactable region 130. In some embodiments wherein the interactable region 130 is a three-dimensional space, determining 202 whether the pointing ray 125 of the second input modality is intersecting with the interactable region 130 may further comprise determining 202 that the pointing ray 125 does not intersect with the interactable region 130 twice. By determining that the pointing ray 125 doesn't intersect twice with the three-dimensional space, it can be ensured that the pointing device is not intended to point at something which is perceived by a user as being behind or in front of the interactable region 130.

After it has been determined whether the pointing ray 125 of the second input modality is intersecting with an interactable region 130, the method further comprises a step of, based on the determining 202, switching 214 input modality to the second input modality when the pointing ray 125 of the second input modality is intersecting with the interactable region 130. This could for example indicate that the user is trying to use the second input modality in order to select or interact with a region which is a part of the interactable region 130 being displayed by the displaying device 110, 112.

By using such a method for switching input modality, it becomes possible for a user to switch between eye-tracking and other input modalities, such that the second input modality is chosen as the selected input modality for the displaying device whenever the second input modality is being used by the user in such a way that the pointing ray 125 of the second input modality is intersecting with the interactable region 130. This may also be seen as that the pointing ray 125 of the second input modality is pointing inside of the interactable region 130, which is an indication that the user of the second input modality intends to interact with something inside of the interactable region 130. By having such methods and devices enabled to use such methods, a good user-experience may be provided which provides seamless transition between input modalities without the user having to worry about actively performing unnecessary steps, such as e.g. having to change a setting on the displaying device in order to switch input modality.

In some embodiments, the displaying device 110, 112 is a HMD display 110 and the interactable region 130 is projected at a predetermined distance 111 by the HMD display 110. The interactable region 130 may in some embodiments be projected as a two-dimensional plane. In some embodiments, the interactable region 130 is a three-dimensional space. Further, the interactable region 130 may be displayed at a plurality of two-dimensional planes or within a three-dimensional space. In some embodiments, the displaying device 110, 112 is a physical display 112, wherein the interactable region 130 is displayed at the physical display 112. The interactable region 130 of the physical display 112 may be two-dimensional. However, the physical display 112 may be curved, such as having a concave shape.

In some embodiments, the displaying device is a HMD and the interactable region 130 is defined by a predetermined maximum angle relative to a direction of the head of the user of the HMD. In some embodiments, the interactable region is further defined by taking into account an offset between an origin of the first input modality, which is often corresponding to or at least is correlated with the head direction of the user, and an origin of the pointing ray, which reflects that the origin of the first input modality and the origin of the second input modality may be different. In some embodiments, the method may thus comprise determining an origin of the first input modality, and/or determining an origin of the second input modality, wherein this information may be used as a basis for other method steps.

In some embodiments, determining a direction of the head of the user, which may also be referred to as the head direction of the user, comprises determining a direction of the HMD which the user is wearing, since the direction of the HMD will correlate with the head direction of the user by virtue of the HMD being located on the head of the user during use. Such an embodiment would then entail that the size of the interactable region 130 is constant, but that the position of the interactable region 130 may change as the head direction of the user changes. In some embodiments, the interactable region 130 is defined by the parts of a VR and/or AR application that the user can interact with by using the input modalities of the displaying device.

In some embodiments, the switching 214 is only performed if the pointing ray 125 of the second input modality is also intersecting with a user-selectable region within the interactable region 130. Examples of user-selectable regions include icons and other representations which indicate or denote something that a user can select. In virtual reality applications, the user-selectable regions may be virtual and only displayed by the displaying device. In augmented reality applications, the user-selectable regions may be a virtual representation of a physical object in the real world. In embodiments wherein the switching 214 is only performed if the pointing ray 125 of the second input modality is also intersecting with a user-selectable region within the interactable region 130, the method may further comprise a step of determining 204 if the pointing ray of the second input modality is intersecting a user-selectable region, and the step of switching 214 input modality may further be based on the step of determining 204 if the pointing ray of the second input modality is intersecting a user-selectable region, such that the switching 214 is only performed if the pointing ray of the second input modality is also intersecting the user-selectable region.

By only performing the switching 214 when the pointing ray 125 of the second input modality also intersects with a user-selectable region, a user can avoid accidentally switching to the second input modality if it is inadvertently brought into the interactable region 130 without an intent to interact with any object within the interactable region 130, but still switch when there is a clearer indication that the user actually intends to select the user-selectable region.

In some embodiments, the method further comprises determining 206 a normal to the interactable region 130, and further wherein the switching is only performed if an angle between the normal to the interactable region 130 and the pointing ray 125 of the second input modality is below a predetermined threshold. The step of determining 206 a normal to the interactable region 130 is mainly relevant for applications wherein the displaying device is a remote displaying device, such as a TV. By first determining a normal to the displaying device, and then performing the switching only when an angle is below a certain threshold, it is possible to avoid switching input modality if the pointing ray 125 of the second input device is pointing at a relatively high angle relative to the normal of the displaying device. This could be relevant e.g. in case the displaying device is a relatively wide screen, such that the user rarely or never would intend to interact with anything in the far sides of the interactable region 130.

In some embodiments, the switching to the second input modality is only performed if a rate of change of the pointing ray of the second input modality is above or below a predetermined threshold. By doing this, it is possible to avoid switching input modality in case the rate of change indicates e.g. an inadvertent movement by the user, for example if the rate of change is very slow, which could indicate that the user is inadvertently moving the second input modality by e.g. leaning on it, or in case the rate of change is very fast, which could indicate that the user accidentally bumped into the second input modality. Further, in some implementations the time duration during which a rate of change of the pointing ray of the second input modality is detected may be used as a basis to determine if the switching 214 should be performed. By taking the time duration of a rate of change into consideration, it becomes possible to avoid switching in case the time duration is very short, indicating an inadvertent movement of the second input modality.

In some embodiments, the method further comprises determining 208 the direction of the head of the user of the displaying device, and further wherein the switching 214 is only performed if an angle between the head direction of the user and the pointing ray 125 of the second input modality is below a predetermined threshold. This would primarily be applicable in cases wherein the displaying device is a HMD intended to be worn on the user's head, such as is the case in e.g. VR and AR applications. The reason for determining 208 the direction of the head of the user of the displaying device is similar to the reason for having the step of determining 206 a normal to the interactable region 130 in the case of remote displays, but which is more applicable to embodiments wherein the displaying device is a HMD. The main reason for determining 206 a normal to the interactable region 130 in the case of a remote display but determining 208 the direction of the head of the user of the displaying device in the case of a HMD display, is that a remote display is most likely stationary, whereas the position of a HMD changes as the position of the user's head changes. By determining 208 the direction of the head of the user of the displaying device and then only performing the switching 214 in the angle is below a predetermined threshold, switching when the user is pointing at the far ends of the interactable region 130 can be avoided.

In some embodiments, the gaze data of the user comprises a gaze ray of the first input modality, similar to the pointing ray of the second input modality in that it indicates what the user intends to interact with in the interactable region. Further, the step of switching 214 to the second input modality may in some embodiments only be performed if an angle between the gaze ray of the first input modality and the pointing ray of the second input modality is below a predetermined threshold. In some embodiments, this may entail a step of determining 210 a gaze ray for the first input modality, determining a pointing ray for the second input modality, and determining an angle between the pointing ray and the gaze ray.

In embodiments comprising the step of determining 210 a gaze ray for the first input modality, the eye-tracking feature is used to determine where the user of the displaying device is looking. The gaze ray of the first input modality is similar to the pointing ray of the second input modality, but differs in how it is determined and in that the eyes of a user is the source used to determine the ray. Further, in some embodiments the gaze ray of the user may be visually represented to the user, either in the virtual world or in the real world. In some embodiments, the point where the gaze ray intersects with the interactable region is indicated visually to a user, either virtually or in the real world.

In some embodiments, the displaying device is further in communication with a third input modality, wherein the third input modality is an input modality other than an eye tracker which is configured to determine a pointing ray. Furthermore, the method may further comprise a step of determining 212 whether the pointing ray of the third input modality is intersecting with the interactable region, and switching 214 input modality to the third input modality if the pointing ray of the third input modality is intersecting with the interactable region. In some embodiments, there is a predetermined relationship or priority between the second and third input modalities, such that if the pointing ray of the second input modality and the pointing ray of the third input modality both intersect with the interactable region, the input modality with higher priority will be chosen as the selected input modality for the displaying device. In some embodiments, both the second and third input modalities may be selected as the selected input modalities for the displaying device if the pointing ray of the second input modality and the pointing ray of the third input modality both intersect with the interactable region.

In some embodiments, the direction of the ray of an input modality is indicated by the corresponding input modality. In other words, the direction of the pointing ray of the second pointing device may be indicated by the second pointing device. In embodiments wherein the first input modality comprises a gaze ray, the first input modality may be adapted to indicate the direction of the gaze ray. In some embodiments, the pointing ray of the first input modality may originate from the displaying device. In some embodiments, the pointing ray of the second input modality may originate from the displaying device, or from the same position as the displaying device. In some embodiments, the pointing ray of the second input modality may originate from the second input modality. In some embodiments, the pointing ray of the second input modality and/or the gaze ray of the first input modality is visible to a user, either in the real world or in a virtual world displayed by the displaying device. In embodiments comprising a third input modality, the pointing ray of the third input modality may be indicated by the third input modality.

In some embodiments, at least one of the first, second and third input modalities comprises a pointing device, such as a hand-held pointer or a hand-gesture based pointing device.

In some embodiments, the method may further comprise determining whether the pointing ray of the second input modality is intersecting with the interactable region, and based on the determining, switching input modality back to the first input modality when the pointing ray of the second input modality is not intersecting with the interactable region. This would reflect a scenario in which the first input modality, i.e. eye-tracking, is once again used as the selected input modality when the user points the second input modality away from the interactable region.

In some embodiments, the methods described above in relation to FIG. 4 may be modified such that the second input modality starts out as being the selected user input modality, and that the step of switching 214 input modality to the second input modality when the pointing ray of the second input modality is intersecting with the interactable region is instead a step of switching from the second input modality to the first input modality when the pointing ray of the second input modality is not intersecting with the interactable region. This could be seen as an alternate embodiment of switching from a pointing device to eye-tracking when the pointing device is no longer being used, instead of switching from eye-tracking to a pointing device when a pointing device starts being used.

Figure 5:
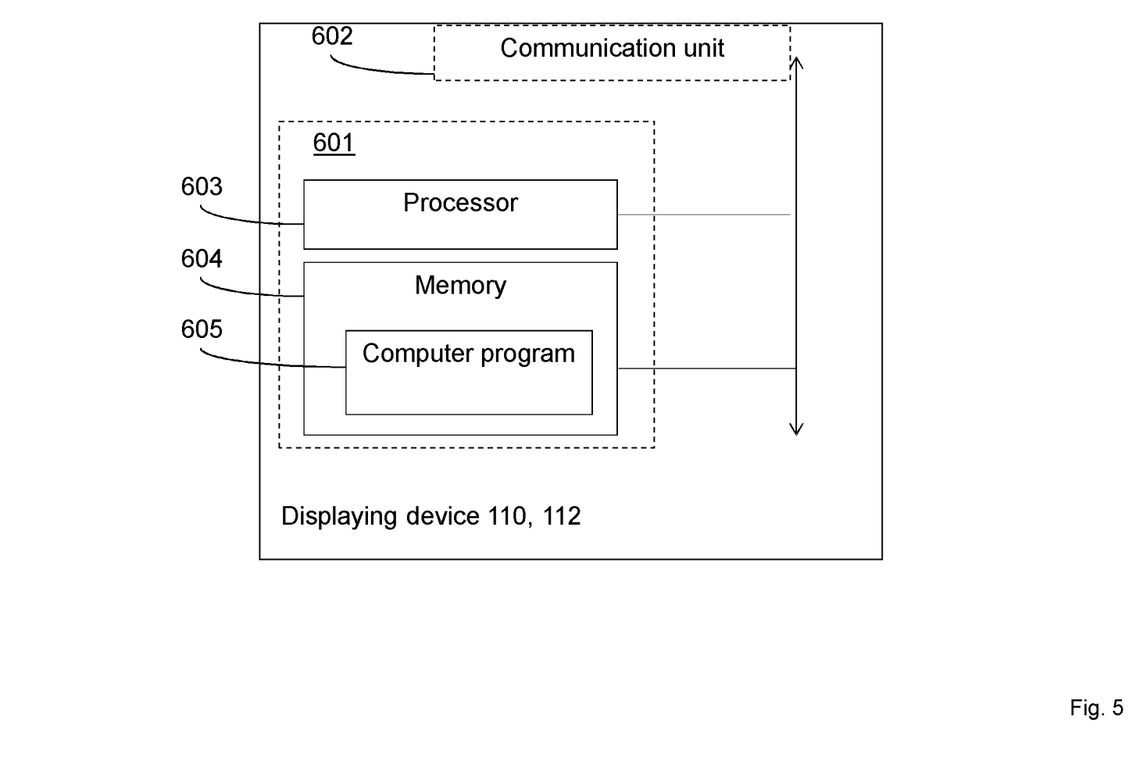
FIG. 5 shows a block schematic of a displaying device according to an embodiment.

FIG. 5, in conjunction with FIG. 1, shows a displaying device 110, 112, operable for displaying an interactable region 130, wherein the displaying device 110, 112 is in communication with a first input modality and a second input modality 120, wherein the first input modality is an eye tracker configured to determine gaze data of a user 105, and the second input modality 120 is an input modality other than an eye tracker configured to determine a pointing ray 125; 417, wherein the first input modality is selected as the input modality of the displaying device. The displaying device 110, 112 may be a Head Mounted Display, HMD, 110, or it may be a physical display 112.

The displaying device 110, 112 comprises processing circuitry 603 and a memory 604. The processing circuitry 603 may comprise one or more programmable processor, application-specific integrated circuits, field programmable gate arrays or combinations of these (not shown) adapted to execute instructions. The memory contains instructions executable by said processing circuitry, whereby the displaying device 110, 112 is operative for determining whether the pointing ray 125; 417 of the second input modality 120 is intersecting with the interactable region 130. The displaying device 110, 112 is further operative for, based on the determining, switching the input modality of the displaying device 110, 112 to the second input modality 120 when the pointing ray 125; 417 of the second input modality 120 is intersecting with the interactable region 130.

The displaying device 110, 112 that performs the method may in some embodiments be a group of network nodes, wherein functionality for performing the method are spread out over different physical, or virtual, nodes of the network. In other words, the displaying device switching input modalities of a displaying device may be a cloud-solution, i.e. the displaying device 110, 112 may be deployed as cloud computing resources that may be distributed in the network.

According to an embodiment, the displaying device 110, 112 is a physical display 112, and the interactable region 130 is displayed at the physical display 112.

According to an embodiment, the displaying device 110, 112 is a HMD display 110 and the interactable region 130 is projected at a predetermined distance 111 by the HMD display 110.

According to an embodiment, the switching is only performed if the pointing ray 125; 417 of the second input modality 120 is also intersecting with a user-selectable region 310, 312, 314; 420 in the interactable region 130.

According to an embodiment, the displaying device 110, 112 is further operative for determining a normal to the interactable region 130, and further wherein the switching is performed in an angle between a normal to the interactable region 130 and the pointing ray 125; 417 of the second input modality 120 is below a predetermined threshold.

According to an embodiment, the displaying device 110, 112 is further operative for, prior to the switching, determining a direction of the head of the user 105 of the displaying device, and further wherein the switching is only performed if an angle between the direction of the head of the user 105 and the pointing ray 125; 417 of the second input modality 120 is below a predetermined threshold.

According to an embodiment, the gaze data of the user comprises a gaze ray 115, and further wherein the switching is only performed when an angle between the gaze ray 115 and the pointing ray 125; 417 is below a predetermined threshold.

According to an embodiment, the displaying device 110, 112 is in communication with a third input modality, the third input modality being an input modality other than an eye-tracker which is configured to determine a pointing ray, wherein the displaying device is further operative for determining whether the pointing ray of the third input modality is intersecting with the interactable region 130, and based on the determining, switching input modality to the third input modality if the pointing ray of the third input modality is intersecting with the interactable region 130.

According to an embodiment, at least one of the second and third input modalities comprises a pointing device 410, such as a hand-held pointer or a hand-gesture based pointing device.

According to an embodiment, a direction of the pointing ray of an input modality is indicated by the input modality.

According to other embodiments, the displaying device 110, 112 may further comprise a communication unit 602, which may be considered to comprise conventional means for communicating with other entities in a communications system, for examples entities comprising processing circuitry and optionally a memory. The instructions executable by said processing circuitry 603 may be arranged as a computer program 605 stored e.g. in the memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above.

The computer program 605 may comprise computer readable code means, which when run in a displaying device 110, 112 causes the displaying device 110, 112 to perform the steps described in any of the described embodiments of the displaying device 110, 112. The computer program 605 may be carried by a computer program product connectable to the processing circuitry 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity which the displaying device has access to via the communication unit 602. The computer program may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for switching user input modality of a displaying device displaying an interactable region, wherein the displaying device is in communication with a first input modality and a second input modality wherein the first input modality is an eye tracker configured to determine gaze data of a user and the second input modality is an input modality other than an eye tracker configured to determine a pointing ray wherein the first input modality is selected as the input modality of the displaying device the method comprising:
   determining whether the pointing ray of the second input modality is intersecting with the interactable region;
   based on the determining switching the input modality of the displaying device to the second input modality when the pointing ray of the second input modality is intersecting with the interactable region; and
   prior to the switching determining a direction of the head of the user of the displaying device, and further wherein the switching is only performed if an angle between the direction of the head of the user and the pointing ray of the second input modality is below a predetermined threshold.

2. The method according to claim 1, wherein the displaying device is a physical display wherein the interactable region is displayed at the physical display.

3. The method according to claim 1, wherein the displaying device is a HMD display and the interactable region is projected at a predetermined distance by the HMD display.

4. The method according to claim 1, wherein the displaying device is an HMD display and the interactable region is defined by predetermined maximum angle between a direction of the head of the user of the HMD and the pointing ray of the second input, modality.

5. The method according to claim 1, wherein the switching is only performed if the pointing ray of the second input, modality is also intersecting with a user-selectable region in the interactable region.

6. The method according to claim 1, further comprising:
   determining a normal to the interactable region and further wherein the switching is performed in an angle between a normal to the interactable region and the pointing ray of the second input modality is below a predetermined threshold.

7. The method according to claim 1, wherein the gaze data of the user comprises
   a gaze ray; and
   wherein the switching is only performed when an angle between the gaze ray and the pointing ray is below a predetermined threshold.

8. The method according to claim 1, wherein the displaying device is in communication with a third input modality, the third input modality being an input modality other than an eye-tracker which is configured to determine a pointing ray, wherein the method further comprises:
   determining whether the pointing ray of the third input modality is intersecting with the interactable region; and
   based on the determining switching input modality to the third input modality if the pointing ray of the third input modality is intersecting with the interactable region.

9. The method according to claim 1, wherein at least one of the second and third input modalities comprises a pointing device, such as a hand-held pointer or a hand-gesture based pointing device.

10. The method according to claim 1, wherein a direction of the pointing ray of an input modality is indicated by the input modality.

11. A displaying device adapted to display an interactable region, wherein the displaying device is in communication with a first input modality and a second input modality wherein the first input modality is an eye tracker configured to determine gaze data of a user and the second input modality is an input modality other than an eye tracker configured to determine a pointing ray wherein the first input modality is selected as the input modality of the displaying device, the displaying device comprising:
   processing circuitry; and
   a memory, said memory containing instructions executable by said processing circuitry, whereby said displaying device is operative for:
   determining whether the pointing ray of the second input modality is intersecting with the interactable region; and
   based on the determining, switching the input modality of the displaying device to the second input modality when the pointing ray of the second input modality is intersecting with the interactable region.

12. A non-transitory computer readable storage medium storing instructions that upon execution by a displaying device causes the displaying device to perform the following steps:
   determining whether the pointing ray of the second input modality is intersecting with the interactable region; and
   based on the determining, switching the input modality of the displaying device to the second input modality when the pointing ray of the second input modality is intersecting with the interactable region.

13. The non-transitory computer readable storage medium according to claim 12, wherein the carrier is one of an electronic signal, optical signal, or radio signal.

* * * * *